United States Patent Office 3,649,598
Patented Mar. 14, 1972

3,649,598
METHOD FOR PRODUCING CONDENSATION PRODUCTS OF UREA AND FORMALDEHYDE USING SODIUM BORATE AS AN ALKALIZER
Hisao Namioka, Norio Komaki, and Seiji Nishizawa, Niihama-shi, Japan, assignors to Sumitomo Chemical Company, Ltd., Osaka, Japan
No Drawing. Filed Jan. 26, 1970, Ser. No. 5,976
Claims priority, application Japan, Aug. 22, 1969, 44/66,794
Int. Cl. C08g 9/10
U.S. Cl. 260—69 R        5 Claims

ABSTRACT OF THE DISCLOSURE

Urea-formaldehyde condensation products high in slow-acting nitrogen as fertilizers are produced by subjecting urea and aqueous formaldehyde solution to addition reaction at an alkaline condition and in heating condition in the presence of 0.2–4.0% by weight based on the formaldehyde of sodium borate as an alkalizing agent either singly or in combination with other alkalizing agent and subjecting the resulting methylolurea solution to condensation reaction at an acidic condition and in heating condition.

---

The present invention relates to a method for producing condensation products of urea and formaldehyde as nitrogenous fertilizers with high effectiveness. More particularly, the invention pertains to a method for producing condensation products of urea and formaldehyde containing a large amount of slow-acting nitrogen with high effectiveness for plants, e.g. crops and vegetables.

So far urea-formaldehyde condensation products was obtained, in general, according to a process carried out by incorporating a definite amount of urea into an aqueous formaldehyde solution, subjecting the mixture to addition reaction at an alkaline condition and at a temperature of 30°–80° C., and further subjecting the resulting methylolurea solution to condensation reaction at an acidic condition and at a temperature of 30°–100° C. In producing urea-formaldehyde condensation products for fertilizers according to the above-mentioned process, the molar ratio of urea to formaldehyde (U/F) was ordinarily within the range of 1–3. Further, when the condensation reaction was carried out at a lower pH or at a higher temperature, a product higher in condensation degree (or less effective as fertilizer) is obtained.

The above-mentioned reactions are considered as follows:

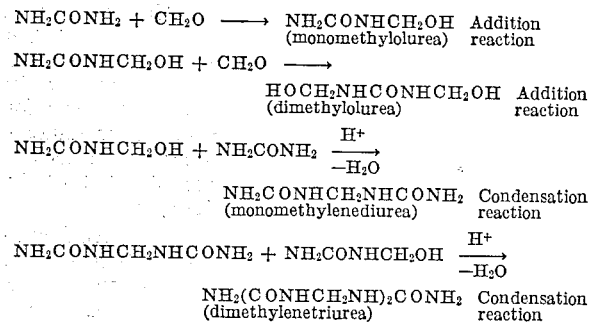

Urea-formaldehyde condensation products formed through such addition and condensation reactions as shown above were a mixture of urea, monomethylenediurea, dimethylenetriurea, trimethylenetetraurea and so on, and therefore the effectiveness of condensation products for plants was varied by a producing condition thereof.

In order to give an index of the effectiveness for plants of such complex urea-formaldehyde condensation products, there has been proposed an analytical method or Official Methods of Analysis of the Association of Official Agricultural Chemists (A.O.A.C. method). By said analytical method, the nitrogen or urea-formaldehyde condensation products is analyzed to obtain a value of free urea nitrogen (F—UN), cold water-insoluble nitrogen (WIN), hot water-insoluble nitrogen (HWIN) and total nitrogen (TN). Then the nitrogen of urea-formaldehyde condensation products is divided to 4 groups, this is, F—UN, WSN=TN—(WIN+F—UN),

HWSN=(WIN)—(HWIN)

HWIN. In the equation, WSN means cold water soluble nitrogen, and HWSN means hot water soluble nitrogen. For example, in the experiments carried out by the present inventors, it was recognized that urea-formaldehyde condensation products, which had been obtained by subjecting urea and an aqueous formaldehyde solution to addition reaction at pH 9.0 and at a temperature of 30° C. for 30 minutes and then subjecting the addition reaction product to condensation reaction at pH 4.0 and at a temperature of 70° C., gave HWIN in amounts of about 96% by weight based on the total nitrogen in case the urea-formaldehyde molar ratio (U/F) was 1.0, about 26% by weight in case the U/F was 1.5, and about 11% by weight in case the U/F was 2.0.

Generally, in urea-formaldehyde condensation products, methyleneureas in low condensation degree are soluble in cold water (that is, WSN) or in hot water (that is, HWSN) and are effectively applicable as nitrogen sources to plants, methyleneurea in high condensation degree, which are insoluble even in hot water (that is, HWIN), are markedly slow in mineralization after application to soil and are scarcely effective for plants. Accordingly, urea-formaldehyde condensation products effective as nitrogenous fertilizers, particularly such fertilizers as having slow-acting properties, are desirably those high in content of WIN and low in content of HWIN. In the United States also, there has been made as a standard for urea-forms (urea-formaldehyde condensation products) that they should have a WIN—TN of more than 60% by weight and an A.I. (availability index) of at least 40% by weight. The terms A.I. referred to in the above signifies the ratio of (WIN—HWIN)/WIN.

In the condensation reaction step employed for the production of urea-formaldehyde condensation products, factors which affect the condensation degrees of methyleneureas are urea-formaldehyde molar ratio, reaction temperature, pH, drying temperature and drying time. Accordingly, for the production of urea-formaldehyde condensation products having desirable slow-acting nitrogen, there have been proposed and practiced various processes in which the above-mentioned factors have been taken into consideration. Among these, processes carried out by subjecting the condensation reaction product to neutralization with such an alkalizing agent as ammonia or calcium carbonate, followed by drying, thereby producing urea-formaldehyde condensation products high in slow-acting nitrogen, are disclosed in, for example, U.S. Pat. Nos. 2,830,036 and 2,810,710 and Industrial and Engineering Chemistry (I&EC), vol. 43, No. 4, pp. 871–875 (1951).

The present inventors have found that when urea-formaldehyde condensation products for fertilizer which have a urea-formaldehyde (U/F) molar ratio within the range of 1–3, are prepared in such a manner that starting urea and aqueous formaldehyde solution are incorporated with sodium borate as an alkalizing agent either singly or in combination with other alkalizing agent and are subjected to reaction at an alkaline condition and in heating condition and then the addition reaction product is subjected to condensation reaction at an acidic condition and in heating condition, followed by drying, the resulting urea-formaldehyde condensation products are far higher in A.I. than urea-formaldehyde condensation products obtained by using in the above-mentioned addition reaction such an alkalizing agent as sodium hydroxide, potassium hydroxide, trisodium phosphate, sodium tripolyphosphate or the like. That is, the present process has such advantage that for the production of urea-formaldehyde condensation products high in slow-acting nitrogen, no such neutralization treatment as disclosed in the aforesaid United States patents is required after completion of the condensation reaction, and steps for the preparation of urea-formaldehyde condensation products effective as nitrogenous fertilizers can be simplified.

In accordance with the present invention, there is provided a process for preparing urea-formaldehyde condensation products high in slow-acting nitrogen as nitrogenous fertilizers which comprises subjecting urea and an aqueous formaldehyde solution in a urea-formaldehyde (U/F) molar ratio within the range of 1–3 to addition reaction at an alkaline condition and in heating condition in the presence of 0.2–4.0% by weight based on the formaldehyde of sodium borate as an alkalizing agent either singly or in combination with other alkalizing agent, and subjecting the resulting methylolurea solution to condensation reaction at an acidic condition and in heating condition, followed by drying.

A methylolurea solution is ordinarily obtained by reacting at an alkaline condition and at a temperature of about 30°–80° C. an aqueous formaldehyde solution having a concentration of more than 35% by weight with crystalline urea or a urea solution having a concentration of more than 75% by weight in a urea to formaldehyde molar ratio of 1–3:1. In this case, sodium hydroxide, potassium hydroxide, sodium carbonate, trisodium phosphate, sodium tripolyphosphate or the like is effectively used as alkalizing agent, in general, and the reaction is effected at a pH within the range of about 7.5–11. When allowed to stand, however, the methylolurea solution obtained in the above manner is lowered in pH with lapse of time due to formation of formic acid and to absorption of carbon dioxide in the air and, when the pH becomes lower than 7.0, condensation reaction takes place to make the methylolurea solution turbid and solid. For example, when the methylolurea solution is adjusted to an initial pH of 8.0 or above by addition of sodium hydroxide, potassium hydroxide, sodium carbonate or trisodium phosphate and is allowed to stand at 50° C., it is recognized that the pH of the solution lowers, after 2–3 hours, to or below 7.0. However, if, in the above case, 0.2–4.0% by weight based on the formaldehyde of sodium borate is added either singly or in combination with other alkalizing agent to the starting urea-aqueous formaldehyde solution according to the present invention, the resulting methylolurea solution is greatly slowed in lowering rate of pH and, even when allowed to stand with an initial pH of 8.0, the methylolurea solution does not show any formation of methyleneurea but can maintain the state of transparent solution for several days. This is evident also from, for example, the results of experiments, which were effected by the present inventors in the following manner:

Sodium borate, sodium hydroxide and trisodium phosphate were added in various proportions, either singly or in combination, to a 37 wt. percent aqueous formaldehyde solution. The mixtures were incorporated with crystalline urea in such an amount that the molar ratio of urea to formaldehyde became 2.0, and were reacted at an alkaline condition in a water bath at 50° C. The resulting methylolurea solution was measured in pH values at definite periods to obtain the results as set forth in the following table:

| Alkalizing agent | | Variation in pH value due to lapse of reaction time (hr.) | | | | | | |
|---|---|---|---|---|---|---|---|---|
| | Amount added (wt. percent) | Initial | After— | | | | | |
| Kind | | | 1 hour | 2 hours | 3 hours | 4 hours | 5 hours | 6 hours |
| Sodium borate | 0.6 | 9.0 | 9.4 | 9.3 | 9.15 | 9.05 | 8.90 | 8.80 |
| Do | 0.2 | 9.0 | 9.0 | 8.4 | 7.5 | 7.5 | 7.5 | 7.45 |
| Sodium borate+10 wt. percent sodium hydroxide solution | 0.2, 0.1 | 10.2 | 9.75 | 8.6 | 7.75 | 7.75 | 7.75 | 7.72 |
| 10 wt. percent sodium hydroxide solution | 0.2 | 9.0 | 6.7 | (¹) | | | | |
| Trisodium phosphate | 0.2 | 10.0 | 7.60 | 7.10 | 7.00 | 7.00 | 6.95 | (¹) |

¹ Turbid.

The amount added is represented by wt. percent based on the starting formaldehyde. In the experiments, the sodium borate and trisodium phosphate were used in the form of powders, and the sodium hydroxide was used in the form of a 10 wt. percent aqueous solution.

As is evident also from the above table, when a process for preparing a methylolurea solution in the presence of sodium borate as an alkalizing agent either singly or in combination with other alkalizing agent, the resulting methylolurea solution is stable in pH value.

In the present invention, the addition reaction is effected at alkaline condition, that is at 7.5 to 11, preferably at pH 8 to 10. This reaction is carried out preferably at 30 to 80° C. for 5 to 60 minutes. In the reaction the sodium borate is used in the form of crystals or of a solution in a suitable solvent and is added either singly or in combination with other alkalizing agent, for example, sodium hydroxide, potassium hydroxide, sodium carbonate, trisodium phosphate, tripotassium phosphate or sodium tripolyphosphate. The manner, time and order of addition of sodium borate are not particularly restricted, but it is most common to adopt such a process that the sodium borate is added to and dissolved in the starting aqueous formaldehyde solution to adjust the solution to an alkaline condition and then urea is incorporated into the thus treated solution. Alternatively, the sodium borate may be incorporated into urea or may be added independently to the reaction system. The amount of sodium borate to be added varies depending on whether it is added singly as an alkalizing agent or is used in combination with other alkalizing agent, and further on the behavior of the starting aqueous formaldehyde solution and the manner of preparation of methylolurea solution. Ordinarily, however, the sodium borate is most effectively used in an amount within the range of 0.2–4.0% by weight based on the starting formaldehyde.

The methylolurea solution, which has thus been formed in the presence of sodium borate, is then adjusted to pH below 7, preferably to pH 3–5 by addition of an acid, e.g. sulfonic, hydrochloric or phosphoric acid, and is subjected to condensation reaction at such an acidic condition as above and a temperature of 30°–100° C. for 1–30 minutes. Resulting reaction product is then cooled and dried, whereby a urea-formaldehyde condensation products are obtained.

Drying temperature is preferably 70–140° C. The lower temperature may be empolyed but drying period becomes longer. Drying period is to be sufficient to make water content of the products below 5% by weight. Obtained urea-formaldehyde condensation products contain about 0.03 to 2% by weight of sodium borate (0.003 to 0.2% by weight as boron).

When the stable methylolurea solution of the present invention was subjected to condensation reaction as above, it was recognized that the resulting urea-formaldehyde condensation products were greatly enhanced in A.I. value which indicated that the content of effective nitrogen as slow-acting nitrogen was high.

Thus, a urea-formaldehyde condensation products obtained by using sodium borate as an alkalizing agent at the time of addition reaction is higher in A.I. value than that obtained by using other alkalizing agent. Although the reason therefor is not evident, it is considered that such increase in A.I. value has some connection with the fact that in the former case the pH of the condensation products after drying is close to neutral condition.

The present invention is illustrated in further detail below with reference to examples, but the invention is not limited to these examples and various modifications are possible within such a scope as not to deviate from the spirit of the invention.

EXAMPLE

To 81 g. of a 37 wt. percent aqueous formaldehyde solution were individually added, based on the amount of formaldehyde, A: 0.6% by weight of sodium borate ($Na_2B_4O_7 \cdot 10H_2O$), B: 2.0% by weight of sodium borate (same as in A), C: 0.6% by weight of sodium borate and 0.4% by weight of 10 wt. percent sodium hydroxide solution, D: 1.0% by weight of 10 wt. percent sodium hydroxide solution, E: 1.3% by weight of 10 wt. percent potassium hydroxide solution, and F: 0.8% by weight of trisodium phosphate ($Na_3PO_4 \cdot 12H_2O$). The mixtures were individually charged with 90 g. of crystalline urea and were reacted at 50° C. for 30 minutes. The resulting methylolurea solution was adjusted to pH 3.6 by addition of 15% by weight of dilute sulfuric acid to induce condensation reaction and were then immediately poured individually into a box having a bottom area of 10 cm. x 10 cm. to form cakes having a definite size. The thus formed cakes were dried at 75°–80° C. for 18 hours to obtain urea-formaldehyde condensation products.

The results of analysis of these condensation products were as set forth in the following table:

| Kind | Alkalizing agent | Amount added (wt. percent) | pH of methylol- urea liquor (50° C.) | pH at the time of methylena- tion | pH of product after drying | Weight percent | | | |
|---|---|---|---|---|---|---|---|---|---|
| | | | | | | TN | WIN | HWIN | A.I. |
| A | Sodium borate | 0.6 | 8.55 | 3.6 | 6.30 | 39.31 | 27.06 | 11.91 | 55.99 |
| B | Sodium borate | 2.0 | 8.90 | 3.6 | 6.85 | 39.48 | 26.88 | 11.27 | 58.07 |
| C | Sodium borate+10 wt. percent sodium hydroxide solution | 0.6, 0.4 | 8.80 | 3.6 | 6.55 | 39.83 | 27.12 | 11.72 | 56.78 |
| D | 10 wt. percent sodium hydroxide solution | 1.0 | 8.60 | 3.6 | 4.80 | 39.48 | 28.16 | 16.05 | 43.00 |
| E | 10 wt. percent potassium hydroxide solution (reference) | 1.3 | 8.45 | 3.6 | 4.75 | 40.12 | 28.49 | 16.30 | 42.79 |
| F | Trisodium phosphate (reference) | 0.8 | 8.70 | 3.6 | 5.30 | 39.52 | 27.22 | 15.22 | 44.09 |

NOTE.—pH of product after drying is the pH of a solution of 10 g. of product in 100 ml. of water (25° C.); $A.I. = \frac{WIN-HWIN}{WIN} \times 100$

What is claimed is:

1. A process for preparing urea-formaldehyde condensation products high in slow-acting nitrogen, characterized in that urea and an aqueous formaldehyde solution in a urea to formaldehyde molar ratio within the range of 1–3:1 are subjected to addition reaction at a temperature of from 30° to 80° C. and at a pH of 7.5 to 11 in the presence of 0.2–4.0% by weight based on the formaldehyde of sodium borate ($Na_2B_4O_7 \cdot 10H_2O$) as an alkalizing agent either singly or in combination with other alkalizing agent, and the addition reaction product is subjected to condensation reaction at an acidic condition and is then dried.

2. A process according to claim 1, wherein the sodium borate is incorporated into the starting aqueous formaldehyde solution.

3. A process according to claim 1, wherein the sodium borate is incorporated into the urea.

4. A process according to claim 1, wherein the sodium borate is incorporated independently.

5. A process according to claim 1, wherein the other alkalizing agent is selected from the group consisting of sodium hydroxide, potassium hydroxide, sodium carbonate, potassium carbonate, trisodium phosphate, tripotassium phosphate and sodium tripolyphosphate.

References Cited

UNITED STATES PATENTS

| 2,415,705 | 2/1947 | Rohner et al. | 71—28 |
| 2,428,752 | 10/1947 | Hewett | 260—69 |
| 2,561,973 | 7/1951 | Cohen | 260—553 |
| 2,592,809 | 4/1952 | Kralovec et al. | 260—69 |
| 2,766,283 | 10/1956 | Darden | 260—553 |
| 2,916,371 | 12/1959 | O'Donnell | 71—28 |
| 3,198,761 | 8/1965 | O'Donnell | 260—29.4 |

OTHER REFERENCES

Journal of American Chemical Society, vol. 74, June 1952, pp. 2713–2715, Smythe.

HOWARD E. SCHAIN, Primary Examiner

U.S. Cl. X.R.

71—28, 29, 64 F; 260—71